(12) United States Patent
Sakai et al.

(10) Patent No.: US 6,652,675 B2
(45) Date of Patent: Nov. 25, 2003

(54) COPPER ALLOY SLIDING MATERIAL

(75) Inventors: Kenji Sakai, Nagoya (JP); Naohisa Kawakami, Nagoya (JP); Satoru Kurimoto, Nagoya (JP); Koichi Yamamoto, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 100 days.

(21) Appl. No.: 09/749,401

(22) Filed: Dec. 28, 2000

(65) Prior Publication Data

US 2001/0019779 A1 Sep. 6, 2001

(30) Foreign Application Priority Data

Feb. 8, 2000  (JP) ......................................... 2000-030449

(51) Int. Cl.⁷ .............................. C22C 9/02; C22C 1/04; F16C 33/12
(52) U.S. Cl. ......................... 148/433; 148/432; 384/276
(58) Field of Search ................................ 148/432, 433; 384/276

(56) References Cited

U.S. PATENT DOCUMENTS

| 4,334,926 A | 6/1982 | Futamura et al. |
| 4,608,085 A | 8/1986 | Eudier et al. |
| 5,282,908 A | 2/1994 | Nakashima et al. |
| 5,303,617 A | 4/1994 | Asada et al. |

FOREIGN PATENT DOCUMENTS

| GB | 648379 | | 1/1951 |
| GB | 2 285 266 | | 7/1995 |
| GB | 2 312 679 | | 11/1997 |
| GB | 2 355 016 | | 4/2001 |
| JP | 60174842 | * | 9/1985 |
| JP | 62 67143 | | 3/1987 |
| JP | 7 166278 | | 6/1995 |
| JP | 08283889 | * | 10/1996 |

* cited by examiner

Primary Examiner—Sikyin Ip
(74) Attorney, Agent, or Firm—Browdy and Neimark, P.L.L.C.

(57) ABSTRACT

Disclosed is a copper alloy sliding material having a metal structure wherein intermetallic compounds exist adjacently to Pb-phase islands and/or Bi-phase islands. Because intermetallic compounds exist between the matrix and the Pb phase and/or the Bi phase, the material can have improved anti-seizure property, since, under load or due to wear, the surface of the material has recessions at the soft Pb and/or Bi phase and the matrix with respect to the intermetallic compounds.

6 Claims, 4 Drawing Sheets

COPPER ALLOY SLIDING MATERIAL

BACKGROUND OF THE INVENTION

1. Field of the Invention

The present invention relates to a copper alloy sliding material and a plain bearing with the sliding material, more particularly a copper alloy sliding material having improved properties of fatigue resistance and anti-seizure.

2. Brief Description of the Art

There has been known a plain bearing with utilization of Kelmet as the copper alloy sliding material. The Kelmet plain bearing has been used for motor vehicle engines and so on, which comprises a back steel, a sintered Cu—Pb system alloy layer provided on the back steel and an overlay layer provided on the sintered Cu—Pb system alloy layer. The Kelmet plain bearing exhibits good anti-seizure property even if the overlay layer is worn out because Pb in the under layer of sintered Cu—Pb system alloy layer is supplied to the sliding-contact surface.

Thus, the known copper alloy sliding materials, typically the Kelmet bearing, have improved anti-seizure property because of a large amount of Pb (i.e. about 20 mass %). While preferably the Pb amount is smaller because Pb adversely affects on the environment, if Pb is reduced, the anti-seizure property is deteriorated since Pb has such an effective function as mentioned above.

On the other hand, in recent motor vehicle engines, bearings tend to be exposed to a higher temperature and a higher specific load because of high rotational speed and high power thereof. However, since the conventional Kelmet bearing contains Pb in a large amount of about 20 mass %, which is soft and has a low melting point, the conventional Kelmet bearing has low strength and poor fatigue resistance especially under a high specific load and has a problem that Pb exposed to a high temperature flows out excessively from its initial points under the sliding-contact with the mating shaft resulting in failure of keeping good anti-seizure property.

SUMMARY OF THE INVENTION

The present invention is proposed under the above technical background.

An object of the invention is to provide a copper alloy sliding material and a plain bearing with the copper alloy sliding material, which can have excellent anti-seizure property while reducing the Pb content and further which exhibits good anti-seizure and fatigue resistance properties even under a high temperature and a high specific load.

The present inventors found that the copper alloy sliding material can have improved bearing properties, especially anti-seizure and fatigue resistance properties by providing it with an alloy structure in which intermetallic compound grains are present adjacently to Pb phase islands and/or Bi phase islands. Such a copper alloy sliding material exhibits excellent foreign substance embeddability and excellent anti-adhesion property since the Pb and Bi phases are soft, and has improved wear resistance since the intermetallic compound is harder than the matrix. In the case where there are present hard intermetallic compound grains between the Pb and/or Bi phase islands and the matrix, the sliding material can have improved anti-seizure property, since, under load or due to wear, the surface (bearing surface) of the sliding material has projections at hard intermetallic compound grains 8 and recessions at the soft Pb and/or Bi phase islands 7 and the matrix 6 as shown in FIG. 2 wherein lubricant oil is retained in the recessions. Further, in the case where there are present hard intermetallic compound grains adjacent to the Pb and/or Bi phase islands in the sliding material, Pb and/or Bi, each having the low melting point is prevented from excessive flowing out by the existing intermetallic compounds whereby the anti-seizure property under high temperature is improved. While there is a concern that the soft Pb and/or Bi phase is liable to become a trigger point of fatigue rupture due to cyclic loading, even if cracks were to occur from trigger points of the Pb and/or Bi phase, they are prevented from extending to the matrix by the hard intermetallic compounds whereby the copper alloy sliding material is improved in fatigue strength.

On the basis of the above consideration, according to a first aspect of the invention, there is provided a copper alloy sliding material comprising Pb and/or Bi in an amount or a total amount of 1 to 10 mass % and having not less than 100 of Vickers hardness, wherein intermetallic compounds are present adjacently to the Pb-phase and/or Bi phase, whereby the sliding material has excellent foreign substance embeddability and excellent anti-adhesion property. The copper alloy sliding material has also excellent anti-seizure property and improved wear resistance and fatigue resistance properties without increasing the amount of Pb and/or Bi. Further, since the sliding material has not less than 100 of Vickers hardness, it is improved in the load capacity and also the fatigue resistance property under a high surface load.

According to one feature of the invention, the copper alloy sliding material is a sintering alloy and comprises, by mass percent, 0.5% to 15% Sn, at least one of 0.5% to 10% Ni and 0.1% to 10% Ag in an amount or a total amount of 0.1% to 10%, at least one of Pb and Bi in an amount or a total amount of 1% to 10%, and the balance essentially of Cu. Thus, when sintering the copper alloy sliding material, Pb and/or Bi melts under a high temperature atmosphere to produce a liquid phase of which catalyst effect promotes diffusion of components of the matrix around the liquid phase so as to produce an intermetallic compound at interfaces among the matrix and Pb and/or Bi phase islands, so that there can be produced a metal structure having an intermetallic compound adjacent to the Pb-phase islands and/or the Bi-phase islands.

Here, a description of the alloying elements of the sintering copper alloy will be provided with regard to reasons of those defined amounts and advantageous effects obtainable from the defined amounts.

(a) Sn (0.5 to 15 mass %)

Sn strengthens the alloy matrix thereby improving the fatigue resistance property of the alloy. It also reacts with Ni and Ag in the matrix around the soft Pb and/or Bi phase islands to produce an intermetallic compound. If the Sn amount is less than 0.5 mass %, the matrix strengthening effect thereof can not be obtained. If it exceeds 15 mass %, Cu—Sn system compounds are produced excessively, so that the alloy becomes brittle. Preferably, the Sn amount is 1 to 11 mass %.

(b) Ni and/or Ag (by mass, 0.5% to 10% Ni and/or 0.1% to 10% Ag in an amount or a total amount of 0.1% to 10%)

Ni and Ag produce intermetallic compounds, for example an Ni—Sn system or an Ag—Sn system, respectively, to strengthen the alloy matrix thereby improving the fatigue resistance property of the alloy. However, less than 0.5 mass % Ni does not form the Ni—Sn system intermetallic compound, and less than 0.1 mass % Ag does not form the Ag—Sn system intermetallic compound. An excess amount of Ni and/or Ag exceeding 10 mass % in an amount or a total amount makes the matrix too brittle resulting in an unpreferable copper alloy sliding material.

(c) Pb and/or Bi (by Mass, 1% to 10% in an Amount or a Total Amount)

Pb and Bi form a liquid Pb-phase and a liquid Bi-phase during sintering, respectively, to promote the sintering reaction. The liquid Pb-phase and the liquid Bi-phase form soft phases dispersed in the matrix, respectively, to improve foreign substance embeddability and anti-seizure property of the alloy. If Pb and/or Bi is less than 1 mass % in an amount or a total amount, the above properties can not be obtained. An exceeding 10 mass % amount thereof deteriorates strength including fatigue strength of the alloy.

According to another feature of the invention, the copper alloy sliding material further comprises, by mass percent, one or more of Fe, Al, Zn, Mn, Co and P (phosphorous) in an amount or a total amount of not more than 40%, whereby the matrix is strengthened to improve fatigue resistance of the alloy. However, an excess amount of one or more of them exceeding 40 mass % in an amount or a total amount makes the matrix too hard, thereby to deteriorate the conformability resulting in an unpreferable copper alloy sliding material.

According to a second aspect of the invention, there is provided a plain bearing comprising a back metal and the copper alloy sliding material being provided on the back metal. The plain bearing can be used for high speed and high power engines for motor vehicles. When it is applied to such an engine, it exhibits good properties of anti-seizure, wear resistance and load carrying capacity under harsh operational conditions.

According to one feature of the plain bearing, an overlay layer of metal and/or resin is provided on the copper alloy sliding material. The plain bearing is excellent in initial conformability, foreign substance embeddability and anti-seizure property.

Referring to the attached drawings, an embodiment of the invention, which is applied to an engine bearing for motor vehicles, will be described herein below.

BRIEF DESCRIPTION OF A PREFERRED EMBODIMENT OF THE PRESENT INVENTION

Figure 3:
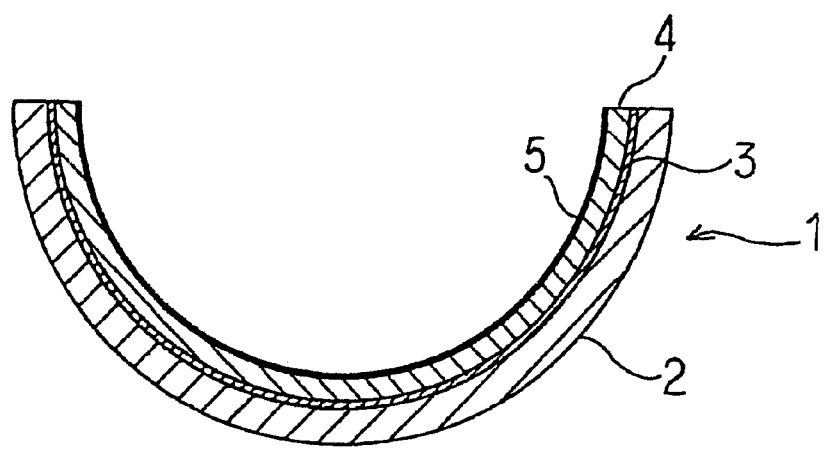
FIG. 3 is a cross-sectional view of an embodiment half shell bearing according to the invention.

A half shell bearing 1 is shown FIG. 3, which is used as one pair of them. The bearing 1 comprises a back metal 2 which is made of a thin steel plate, for example, a copper alloy sliding material 4 which is provided on the back steel 2 via a bonding layer 3 of copper plating and an overlay layer 5 which is made of a soft metal or resin and provided on the copper alloy sliding material 4.

The copper alloy sliding material 4 is of a sintered alloy which consists of, by mass percent, 0.5% to 15% Sn, at least one of 0.5% to 10% Ni and 0.1% to 10% Ag in an amount or a total amount of 0.1% to 10%, at least one of Pb and Bi in an amount or a total amount of 1% to 10%, and the balance essentially of Cu. It may further comprise, by mass percent, one or more of Fe, Al, Zn, Mn, Co and P in an amount or a total amount of not more than 40%. Preferably, the surface hardness of the copper alloy sliding material 4 on the back metal 2 has a Vickers hardness of not less than 100.

There is described, here, a method of producing the half shell bearing 1.

At first, an alloy powder having the above chemical composition of the sintering alloy is prepared from alloy components of Sn, one or more of Ni and Ag, one or more of Pb and Bi, and Cu. The alloy powder may comprise one or more of Fe, Al, Zn, Mn, Co and P. Preferably, each particle of the alloy powder has a particle size of not more than 250 μm. The alloy powder may be a pre-alloyed powder or a powder mixture of alloy components.

The alloy powder (i.e. the copper alloy sliding material 4) is uniformly spread on a steel plate of which surface is plated with copper (i.e. the bonding layer 3). The steel plate with the alloy powder is heated at a temperature of 800 to 920° C. in a reduction atmosphere for about 15 minutes for sintering the alloy powder. The steel plate with a sintering layer is subjected to rolling. Finally, the rolled plate is again heated in order to further sinter the sintering layer, so that a bimetal plate is produced, in which a layer of the copper alloy sliding material 4 is provided on the steel plate.

During sintering in the process of producing the bimetal plate, Pb and/or Bi is melted to be a liquid phase and intermetallic compounds, such as an Ni—Sn system and an Ag—Sn system, produced adjacently to the Pb and/or Bi phase.

If a further amount of such intermetallic compounds is desired to provide at the interface between the Pb and/or Bi phase and the matrix, it is advisable to subject the bimetal plate to a heat treatment at 350 to 500° C. for several hours after the second sintering treatment. Thereafter, if the hardness of the sintering layer has not reached 100 of Vickers hardness, the bimetal is subjected to further rolling in order to obtain a Vickers hardness not less than 100 or improve the fatigue resistance of the sintering layer by further strengthening.

The thus produced bimetal plate is cut to a rectangular piece so as to have a predetermined width and a predetermined length. The sized bimetal plate is bent to a hemicircular form and subsequently subjected to finish machining of the surface of the sintering layer (i.e. the copper alloy sliding material 4). Thereafter, an overlay layer 5 is provided on the sintering layer, so that the half shell bearing 1 shown in FIG. 3 is produced. Two of the half shell bearing 1 are associated with each other to a cylindrical form and used for engine bearings, for example, a main bearing receiving a crank shaft, a connecting rod bearing and so on.

It is noted that the above half shell bearing 1, as one example, comprised the back metal 2 with a thickness of 1.2 mm, the bonding layer 3 with a thickness of 5 μm, the copper alloy sliding material 4 with a thickness of 0.3 mm and the overlay layer 5 with a thickness of 10 μm.

Figure 4:
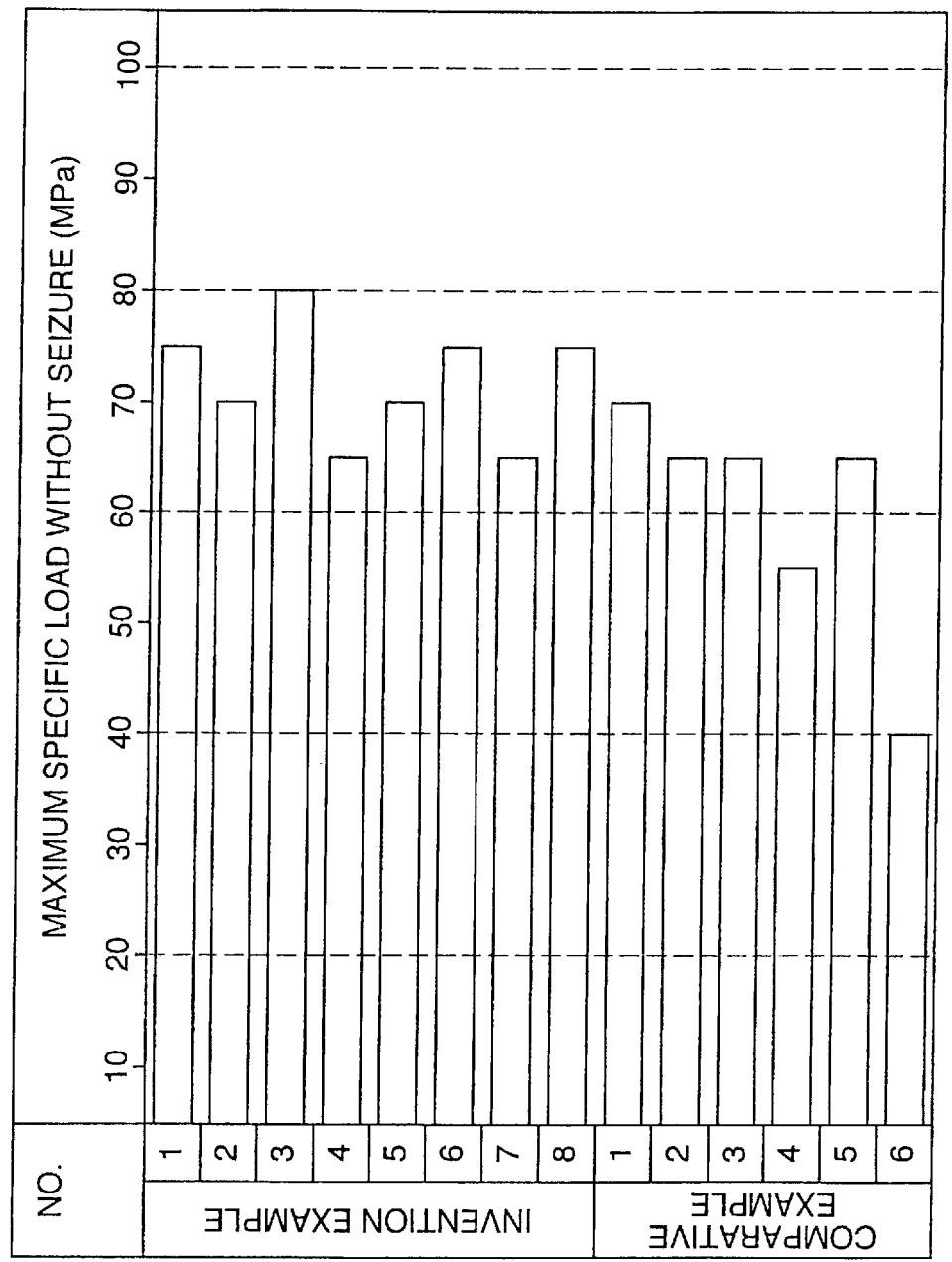
FIG. 4 is a graph showing results of a seizure test.
Figure 5:
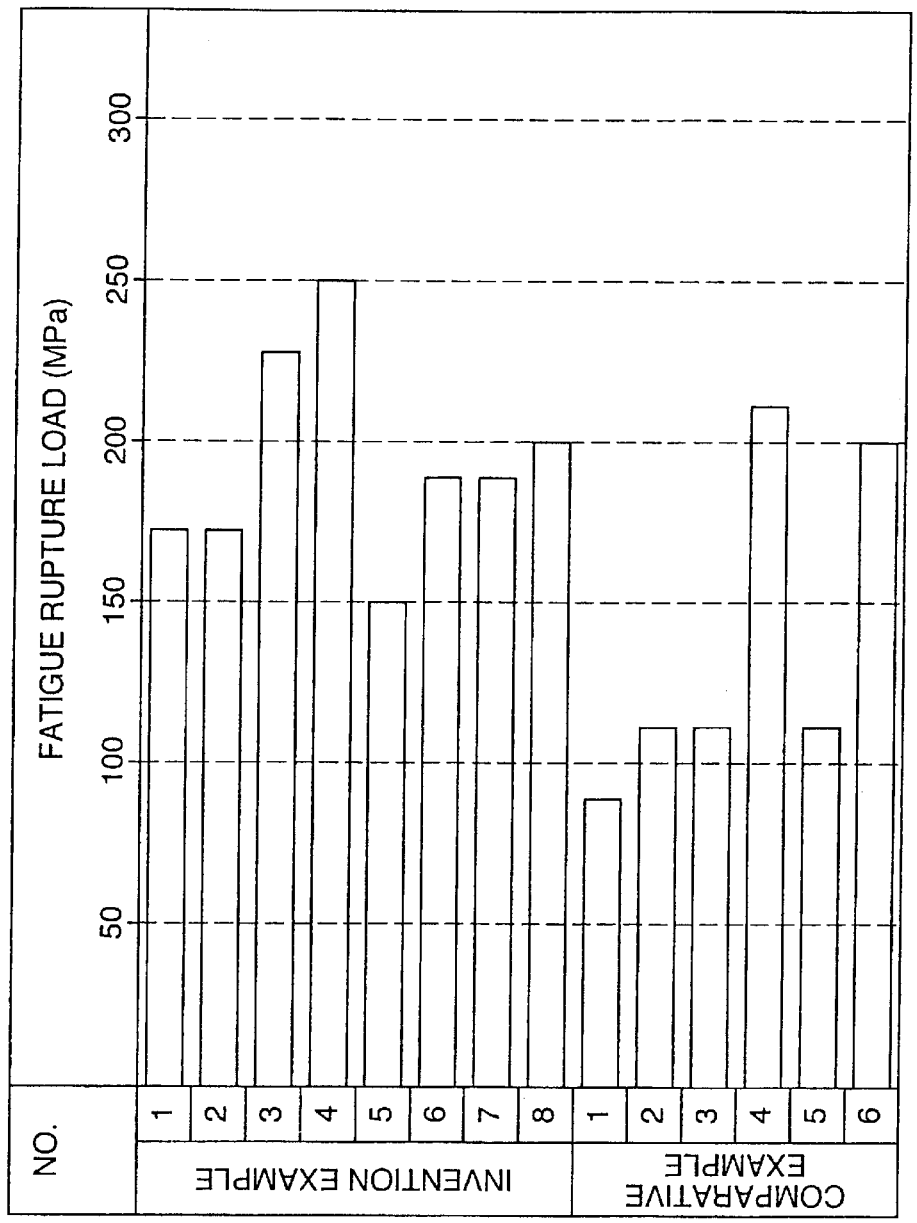
FIG. 5 is a graph showing results of a fatigue test.

The present inventors carried out tests of hardness, seizure and fatigue on invention examples and comparative examples of copper alloy sliding material of which chemical compositions are shown in Table 1 which includes also the result of the hardness test. The results of the seizure and fatigue tests are shown in FIGS. 4 and 5, respectively. The hardness test was carried out with utilization of a Vickers hardness testing machine. The seizure test was carried out in the following manner:

1) a rotary shaft was supported by a specimen bearing which had substantially the same structure as that shown in FIG. 3 but lacking an overlay layer such as the overlay layer 5 in the drawing in order to clearly confirm the property of the copper alloy sliding material (corresponding to numeral 4 in FIG. 3), the rotary shaft being driven by an electric motor;

2) at first a running-in operation was conducted for 60 minutes;

3) after the running-in operation, the bearing load was increased step-by-step from a given initial bearing load in such a manner that 5 MPa was accumulated every 10 minutes; and 4) continuously rotating the rotary shaft and increasing the bearing load as stated above, a bearing load at a step just earlier than the relevant step of the bearing load, when the temperature of the bearing back surface exceeded 220° C. or there occurred an abnormal driving current of the electric motor which drives the shaft, was determined as a maximum specific load without seizure.

Test conditions other than the seizure test are shown in Table 2.

The fatigue test was carried out on a small piece specimen only consisting of the copper alloy sliding material on which a testing load was exerted cyclically. The testing load was increased step-by-step from an initial load of 50 MPa in such a manner that 10 MPa was accumulated at every increase of load and the testing load was applied with sine-curvilinear 50,000 cycles at each loading step. A testing load, when there occurred a crack, was regarded as "the fatigue rapture load".

TABLE 1

| No. | COMPONENTS (mass %) | | | | | | HARDNESS* |
|---|---|---|---|---|---|---|---|
| | Cu | Sn | Ni | Ag | Pb | Bi | Hv. 5 |
| INVENTION EXAMPLE | | | | | | | |
| 1 | Bal. | 10 | — | 1 | 10 | — | 115 |
| 2 | Bal. | 3 | 1 | 1 | 5 | — | 110 |
| 3 | Bal. | 11 | 3 | — | 5 | — | 140 |
| 4 | Bal. | 6 | 7 | — | 2 | — | 110 |
| 5 | Bal. | 5 | — | 3 | — | 8 | 114 |
| 6 | Bal. | 3 | 6 | 3 | 8 | — | 142 |
| 7 | Bal. | 6 | — | 1 | 3 | — | 122 |
| 8 | Bal. | 3.5 | 7 | — | 10 | — | 128 |
| COMPARATIVE EXAMPLE | | | | | | | |
| 1 | Bal. | 3.5 | — | — | 23 | — | 87 |
| 2 | Bal. | 10 | — | 1 | 10 | — | 82 |
| 3 | Bal. | 3 | 1 | 1 | 5 | — | 73 |
| 4 | Bal. | 11 | — | — | 5 | — | 135 |
| 5 | Bal. | 5 | — | 3 | — | 12 | 107 |
| 6 | Bal. | 6 | — | 1 | — | — | 123 |

*Note:
The hardness is of Vickers.

TABLE 2

| ITEM | CONDITION |
|---|---|
| SHAFT DIAMETER | 53 mm |
| BEARING WIDTH | 13 mm |
| PERIPHERAL SPEED OF SHAFT | 10 m/minute |
| LUBRICANT OIL | SAE #20 |
| OIL SUPPLY AMOUNT | 12.5 ml/minute |
| MATERIAL OF SHAFT | JIS S55C as quenched |
| SHAFT SURFACE ROUGHNESS | Rmax: not more than 1.0 μm |

The following is an analysis of the test results.

Figure 1A:
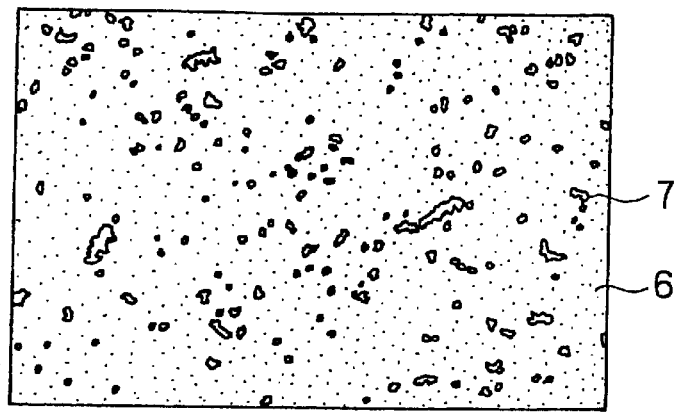
FIG. 1A is a schematic illustration of a microscopic photograph of a magnification of 200, which shows a metal structure of an embodiment sliding material of the invention.
Figure 1B:
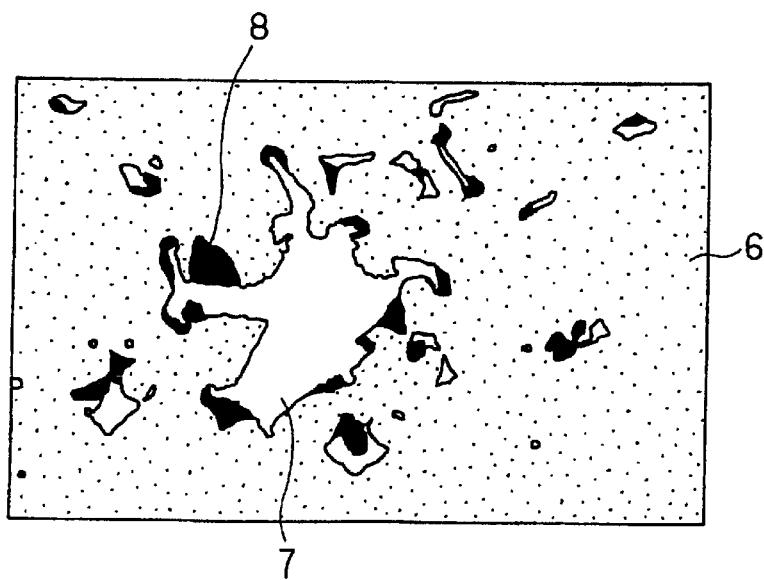
FIG. 1B is a similar drawing to FIG. 1 but only differs therefrom in the point that the latter has a magnification of 2,000.
Figure 2:
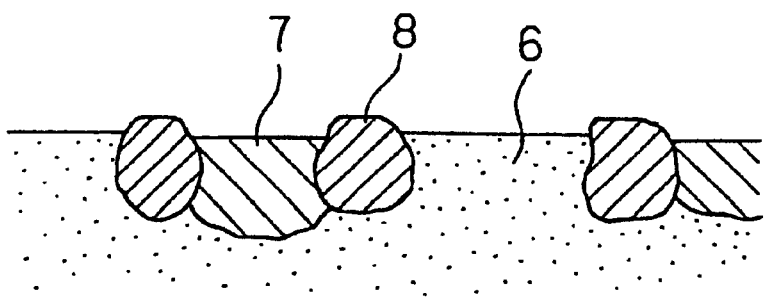
FIG. 2 is a drawing which illustrates a reason why the invention sliding material has improved anti-seizure property.

Comparative Example No. 1 comprises a much amount of 23 mass % of Pb and corresponds to the conventional Kelmet bearing material. Invention Example Nos. 1 to 8 have generally the same anti-seizure property and significantly improved fatigue resistance property with relation to Comparative Example No. 1. This is because the metal structure of the Invention Examples is such that soft phase islands 7 of Pb and/or Bi are dispersed in the matrix 6 as shown in FIG. 1A and hard intermetallic grains 8 of an Ni—Sn system and/or an Ag—Sn system are present adjacently to the soft phase islands 7 as shown in FIG. 1B, the drawings are of schematic illustrations produced from a microscopic observation.

Considering reasons why the copper alloy sliding material with a small amount of Pb could have excellent anti-seizure property, it is believed that, in the case of Example Nos. 1 to 8 wherein the hard intermetallic compounds of an Ni—Sn system and/or an Ag—Sn system are present between the matrix and the phase islands of Pb and/or Bi, when the specimens receive a load or wear during sliding, the soft phase islands 7 of Pb and/or Bi and the matrix 6 at the sliding-contact surface are recessed than the hard intermetallic compounds 8 to retain lubricant oil therein resulting in that the anti-seizure property is improved.

It is further believed that Example Nos. 1 to 8 were improved in the fatigue resistance property because they could have substantially the same anti-seizure property as Comparative Example No. 1 although the former comprised a smaller amount of Pb or Bi than the latter, and that cracks occurred from trigger points of Pb or Bi phase islands are prevented from expanding to the matrix 6 resulting in improved fatigue strength because the harder intermetallic compounds of an Ni—Sn system and/or an Ag—Sn system than the matrix 6 are present close to the phase islands of Pb and/or Bi which are liable to be trigger points of occurrence of fatigue.

Here, a discussion is provided with regard to relationships among the anti-seizure and fatigue resistance properties and amounts of Ni, Ag and amounts of Pb, Bi.

First, Invention Example No. 3 and Comparative Example No. 4 have the same chemical composition of alloy components except for Ni. Invention Example No. 3, comprising Ni of the both elements of Ni and Ag each of which reacts with Sn to produce an intermetallic compound, is excellent in the anti-seizure and fatigue resistance properties than Comparative Example No. 4 comprising none of Ni and Ag. From this, it can be understood that an alloy component of Ni (or Ag) improves the anti-seizure and fatigue resistance properties of the copper alloy sliding material.

Next, Invention Example No. 7 and Comparative Example No. 6 have the same chemical composition of alloy components except for Pb. Invention Example No. 7, comprising Pb of the both elements of Pb and Bi, is slightly inferior in the fatigue resistance property than Comparative Example No. 6 comprising none of Pb and Bi, because Pb is soft. However, a small amount of additive Pb (3 mass %) makes Invention Example No. 7 significantly excellent than Comparative Example No. 6 with regard to the anti-seizure property. Considering that Invention Example No. 7 comprises Ag, it is believed that the improvement of anti-seizure property is in virtue of a synergism of the Ag—Sn system intermetallic compound and Pb.

Here, the amount of Bi (or Pb) will be discussed.

Invention Example No. 5 and Comparative Example No. 5 have the same chemical composition of alloy components except for Bi. Comparative Example No. 5, comprising a much amount of Bi (12 mass %), has substantially the same anti-seizure property but is inferior in the fatigue resistance as compared with Invention Example No. 5. This is because, even if not less than 10 mass % of Bi and/or Pb in total is added to the alloy material, an improvement of the anti-seizure property is not expectable and the fatigue resistance is merely deteriorated.

As stated above, while an excess amount of Pb and/or Bi adversely affects the fatigue resistance of the copper alloy material, the proper amount thereof as defined in the present invention improves the anti-seizure and fatigue resistance properties.

Now, a discussion will be provided with regard to the hardness of the copper alloy sliding material 4.

Invention Example No. 1 and Comparative Example No. 2, and Invention Example No. 2 and Comparative Example No. 3 have the same chemical composition, respectively. But, in the respective combination, the both Examples are different in the hardness from each other. Invention Example Nos. 1, 2 and Comparative Example Nos. 2, 3 have values of the maximum specific load without seizure of which differences are within a variance range of about 10 MPa. Thus, it can be said that they have generally the same anti-seizure property. But, with regard to the fatigue resistance, the hard Invention Example Nos. 1, 2 are significantly excellent than the soft Comparative Example Nos. 2, 3. The copper alloy sliding material is required to have not less than 100 of Vickers hardness in order to have good fatigue resistance in use under a high specific load.

As will be apparent from the above, according to the invention copper alloy sliding material comprising a smaller amount of Pb or an alternative of Bi, excellent anti-seizure and fatigue resistance properties can be obtained. The invention material exhibits good properties of bearing for motor vehicle engines which tend to have a high rotational speed and a high power.

What is claimed is:

1. A copper alloy sliding material which is a sintered alloy having not less than 100 of Vickers hardness, and which consists of, by mass percent,
    0.5% to 15% Sn,
    at least one of 0.5% to 10% Ni and 0.1% to 10% Ag in a total amount of 0.1% to 10%,
    at least one of Pb and Bi in a total amount of 1% to 10%, and
    the balance of Cu and incidental impurities,
    wherein the copper alloy contains intermetallic compounds of Ni—Sn and/or Ag—Sn which are directly adjacent to the Pb-phase and/or the Bi-phase.

2. A plain bearing comprising a back metal and the copper alloy sliding material being defined in claim 1, wherein the copper alloy sliding material is provided on the back metal.

3. A plain bearing according to claim 2, wherein an overlay layer is provided on the copper alloy sliding material, the overlay layer being one or more of metal and resin.

4. A copper alloy sliding material which is a sintered alloy having not less than 100 of Vickers hardness, and which consists of, by mass percent,
    0.5% to 15% Sn,
    at least one of 0.5% to 10% Ni and 0.1% to 10% Ag in a total amount of 0.1% to 10%,
    at least one of Pb and Bi in a total amount of 1% to 10%,
    one or more of Fe, Al, Zn, Co and P (phosphorous) a total amount of not more than 40%, and
    the balance of Cu and incidental impurities,
    wherein the copper alloy contains intermetallic compounds of Ni—Sn and/or Ag—Sn which are directly adjacent to the Pb-phase and/or the Bi-phase.

5. A plain bearing comprising a back metal and the copper alloy sliding material being defined in claim 4, wherein the copper alloy sliding material is provided on the back metal.

6. A plain bearing according to claim 5, wherein an overlay layer is provided on the copper alloy sliding material, the overlay layer being one or more of metal and resin.

* * * * *